United States Patent [19]
Tucker et al.

[11] Patent Number: 6,055,495
[45] Date of Patent: Apr. 25, 2000

[54] SPEECH SEGMENTATION

[75] Inventors: Roger Cecil Ferry Tucker, Monmouth, United Kingdom; Michael John Collins, Philadelphia, Pa.

[73] Assignee: Hewlett-Packard Company, Palo Alto, Calif.

[21] Appl. No.: 08/846,612

[22] Filed: Apr. 30, 1997

[30] Foreign Application Priority Data

Jun. 7, 1996 [EP] European Pat. Off. ............. 96304284

[51] Int. Cl.$^7$ ............................................. G01L 1/06
[52] U.S. Cl. ........................ 704/210; 704/200; 704/208
[58] Field of Search ................................... 704/210, 200, 704/208, 243, 248, 215

[56] References Cited

U.S. PATENT DOCUMENTS

| | | | |
|---|---|---|---|
| 4,092,493 | 5/1978 | Rabiner et al. | 704/251 |
| 4,625,327 | 11/1986 | Sluijter et al. | 704/200 |
| 5,617,507 | 4/1997 | Lee et al. | 704/200 |
| 5,732,394 | 3/1998 | Nakadai et al. | 704/255 |
| 5,742,736 | 4/1998 | Haddock | 704/200 |
| 5,749,066 | 5/1998 | Nussbaum | 704/243 |

FOREIGN PATENT DOCUMENTS

| | | |
|---|---|---|
| 0191531A2 | 2/1986 | European Pat. Off. . |
| 0679005A1 | 3/1995 | European Pat. Off. . |
| WO93/07562 | 4/1993 | WIPO . |

OTHER PUBLICATIONS

European Search Report, EP 96 30 4284, Nov. 7, 1996.

*Primary Examiner*—David R. Hudspeth
*Assistant Examiner*—Daniel Abebe

[57] ABSTRACT

The present invention relates to the management of voice data.

Voice messages left on a recipient's answerphone or delivered via a voicemail system are a popular form of person-to-person communication. Such voice messages are quick to generate for the sender but are relatively difficult to review for the recipient; speech is slow to listen to and, unlike inherently visual forms of messages such as electronic mail or handwritten notes, cannot be quickly scanned for the relevant information. The present invention aims to make it easier for users to find relevant information in voice messages, and other kinds of voice record, such as recordings of meetings and recorded dictation.

According to the present invention we provide a method of speech segmentation comprising processing speech data so as to detect putative pauses and characterised by forming speech block boundaries at a selected subset of the pauses, said selection being based on a preselected target speech block length.

The invention may be applied in an application where speech is represented visually.

16 Claims, 2 Drawing Sheets

SPEECH SEGMENTATION

TECHNICAL FIELD

The present invention relates to a device designed to facilitate the management of voice data. Voice messages, left on a recipient's answerphone or delivered via a voicemail system are a popular form of person-to-person communication. Such voice messages are quick to generate for the sender but are relatively difficult to review for the recipient; speech is slow to listen to and, unlike inherently visual forms of messages such as electronic mail or handwritten notes, cannot be quickly scanned for the relevant information. The present invention aims to make it easier for users to find relevant information in voice messages, and other kinds of voice record, such as recordings of meetings and recorded dictation.

In the long-term it would be desirable to approach this problem by automatically translating speech into text using speech recognition. Unfortunately this approach is not yet practical, since current speech recognition technology cannot accurately transcribe naturally-occurring speech of the kind found in voice messages. Therefore a number of approaches have been developed which help users to review voice data without actually recognizing the speech signal and which provide for the display, structuring and annotation of speech recordings.

BACKGROUND ART

Many approaches assume, but do not necessarily depend on, an underlying technique for displaying a visual representation of speech. One such form of display is a single graphical line, graduated with time markings from start to finish (for example, a 4 second message may contain the appropriately spaced labels "0 sec", "1 sec", "2 sec", "3 sec", "4 sec"). In addition, an algorithm can be used to process the speech record to distinguish the major portions of speech from the major portions of silence. Such speech detection algorithms have been widely used in telecommunications, speech recognition and speech compression. This permits a richer form of graphical display, in which the speech record is still portrayed along a timeline, but with portions of speech displayed as dark segments (for example) and the detected portions of silence displayed as light segments. Two pieces of prior art use this technique:

1. A paper entitled "Capturing, Structuring and Representing Ubiquitous Audio" by Hindus, Schmandt and Horner (ACM Transactions on Information Systems, Vol 11, No.4 October 1993, pages 376–400) describes a prototype system for handling speech.

2. Ades and Swinehart (1986) have built a prototype system for annotating and editing speech records. This system is the subject of their paper entitled "Voice Annotation and Editing in a Workstation Environment" from Xerox Corporation. Their aim is to segment the speech records into units of phrase or sentence size.

Neither of these two references specify the speech segmentation algorithm being used.

A problem with using a speech/silence detector to define the pauses is that the main pauses in a speech record correlate only weakly with the boundaries between phrases.

DISCLOSURE OF INVENTION

According to the present invention we provide a method of speech segmentation comprising processing speech data so as to detect putative pauses and characterised by forming speech block boundaries at a selected subset of the pauses, said selection being based on a preselected target speech block length.

The invention has the advantage of enabling the segmentation of speech data into blocks which approximate to a preselected size useful to the user rather than extremely long or short segments which are more difficult to manage and are less informative. In this way, speech blocks roughly corresponding to phrases can be achieved.

In one embodiment, the method comprises dividing the total duration of the speech data in a file by the target speech block length to derive a desired pause number n;

detecting the n most significant pauses in that file and forming speech block boundaries at these n pauses in the speech data.

This approach achieves a reduced variability between speech blocks in comparison to using a simple pause length threshold. However, some variability remains due to the application of a single threshold to the whole of a speech file.

Preferably, the method comprises:

devising an error metric which indicates how much a speech block length deviates from the target speech block length;

calculating the error value for the speech data in a file;

detecting the most significant pause in the speech data;

calculating the average error value for the speech blocks on either side of the speech block boundary at the pause and retaining the speech block boundary in the speech data if said average error value is less than the current error value;

iteratively detecting the next most significant pause, calculating the average error value for the speech blocks on either side of the speech block boundary at the next most significant pause and retaining the speech block boundary in the speech data if this further reduces the error value.

This approach has the advantage that segmentation decisions are made locally rather than applying a single threshold for a whole file.

In an embodiment to be described, the error value is proportional to the square of the difference between the duration of a speech block and the target speech block length.

Preferably, the error value is proportional to the square of the difference between the square roots of the duration of a speech block and the target speech block length.

Furthermore, the method may comprise the further steps of:

for each speech block boundary which is retained, comparing the average error value for the speech blocks either side of the boundary with the error value for a block comprising the sum of the two blocks, deleting the speech block boundary that gives the greatest error reduction, repeating these steps until no further error value reduction is obtained.

The 'significance' of a pause in the methods defined above may be proportional to the duration of the pause or inversely proportional to the energy of the pause.

The present invention also provides a system for implementing a method as defined above.

In many embodiments a speech/silence detector would be used to identify speech segments before processing the speech data. However, this is not essential and a single-pass segmentation algorithm can be used to obviate the need for a speech/silence detector. Such a single pass algorithm may involve searching raw speech data for the lowest energy interval of predetermined size and treating that lowest energy interval as the most significant pause in the respective speech segment.

A system implementing the present invention may comprise display means for representing speech data in the form of speech blocks.

BRIEF DESCRIPTION OF DRAWINGS

Particular embodiments of the present invention will now be described, by way of example, with reference to the accompanying drawings of which.

BEST MODE FOR CARRYING OUT THE INVENTION & INDUSTRIAL APPLICABILITY

The present invention can be implemented in the context of a "Personal Message Manager" application for browsing voice messages.

The embodiment to be described is written in Microsoft Visual Basic and Borland C on a IBM-compatible Personal Computer, and runs under a Microsoft Windows operating system. Audio recording and playback facilities are supported by a SoundBlaster 16ASP card (Creative Labs, Inc.). These facilities are accessed through the standard MS Windows MultiMedia Application Programmers' Interface. Speech records may be created using a microphone connected to the audio card, and played back via a set of speakers also connected to the card. User input is by means of a mouse. Alternatively speech input may be obtained via a telephone line or a LAN connection.

Figure 1:
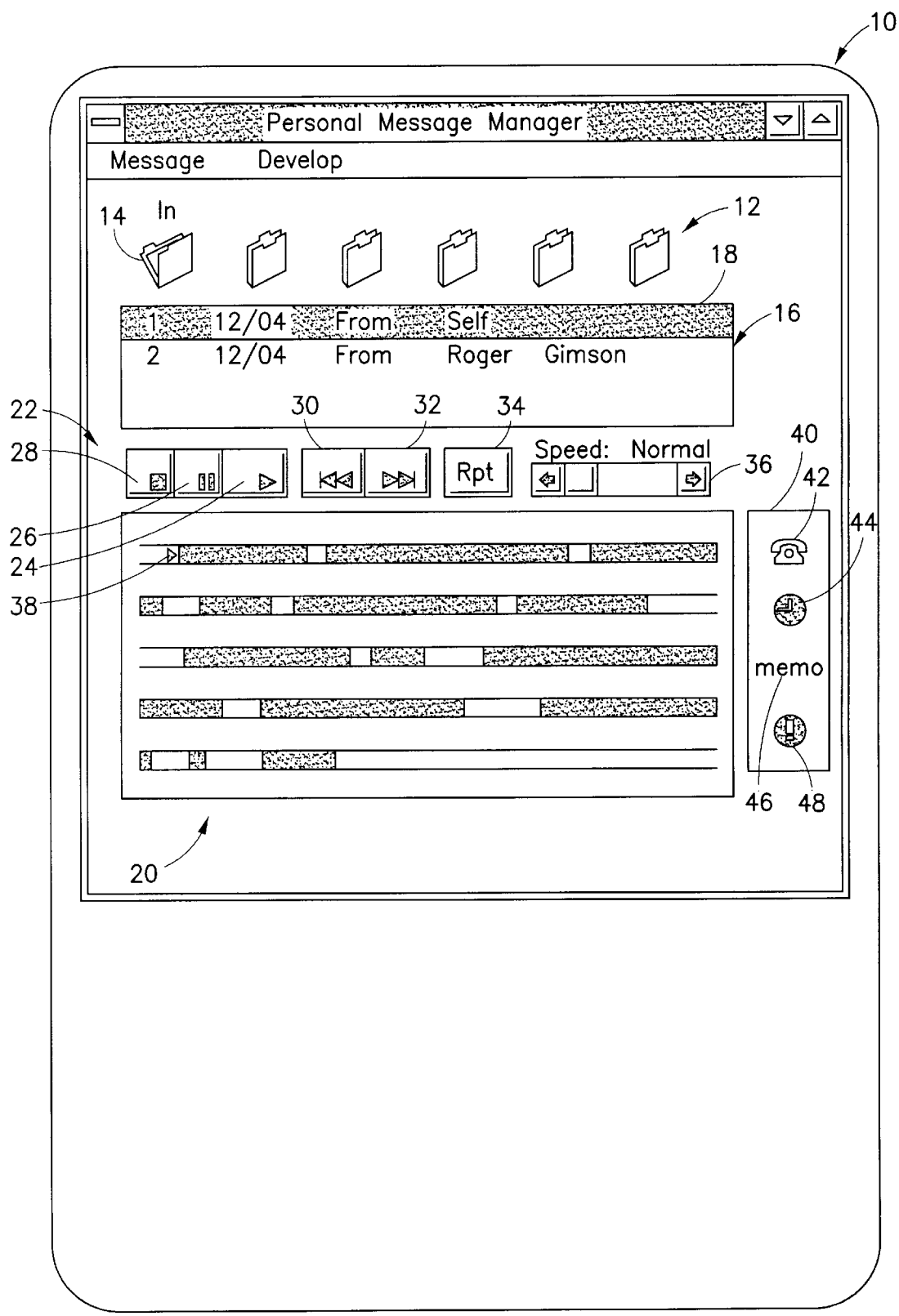
FIG. 1 depicts the user interface of a device according to the present invention.

FIG. 1 shows an interaction screen 10 in a Microsoft Windows user interface. A set of folders represented by icons 12 are for storing previous voice messages. One of the folders 14 has been selected which causes the "header" information for each message in the selected folder to be displayed in a display box 16. The display box 16 displays the date of receipt and the sender of each message. FIG. 1 shows the topmost message 18 having been selected. This causes the selected message 18 to be displayed as a series of blocks in another display box 20. In the display box 20, dark blocks represent speech and white blocks represent silence. Algorithms for segmenting the speech and allowing presentation in this way will be described below.

Above the display box 20 is a set of audio controls 22 to allow the user to play, pause and stop speech playback. The audio controls 22 comprise the following button representations:

a play button 24;
 a pause button 26;
 a stop button 28;
 a previous button 30 to skip playback to the previous block of speech;
 a next button 32 to skip playback to the next block of speech;
 a repeat button 34 to repeat playback of the most recently played block of speech;
 a speed control button 36 to vary the playback speed.

The user can also click directly on a block of speech in the display box 20 eg using a mouse, to play back that specific block. In FIG. 1, an arrow-shaped cursor 38 is shown in the display box 20 to indicate that playback is ready to commence at the beginning of the speech file. As a speech block is being played, its colour changes to give the user a cue to the current position in the speech record.

To the right of the display box 20 is a panel 40 of markers 42, 44, 46, and 48 for labelling portions of the recorded speech. These can be used to provide a visual cue to the contents of a message. There are markers corresponding to a Phone Book 42, a Time/Appointment diary 44, a Memo/Reminder list 46, and a miscellaneous Points of Interest area 48. For example, one segment of the message 18 may contain a speech block such as "If you need to get back to me, my number is 228 455. " This block could be labelled with the Phone marker 42. Whenever a marker is placed on a speech block in the display box 20, that block of speech is automatically linked to a corresponding application in the user's computer system. This automatic linking of speech blocks to other applications using visual markers is convenient for the user and is an important step towards integrating the various applications relevant to handling voice data.

Segmentation of the speech file helps users in the following ways:

Information extraction—this typically occurs the first time a user listens to a file and wishes to extract the important details. This can be rather difficult for long files. The interface shown in FIG. 1 allows the user to go through the file in their own time playing each speech block in turn. Users can go forward or backward to chosen blocks if they wish;

Search—by clicking on blocks a user can quickly browse through a file to locate a particular piece of information eg. a telephone number;

Manipulation—the user may wish to store particular pieces of information for future use and may wish to store them for use with other applications eg. to-do list, phonebook etc. Blocks can easily be selected for use in other applications.

Figure 2:
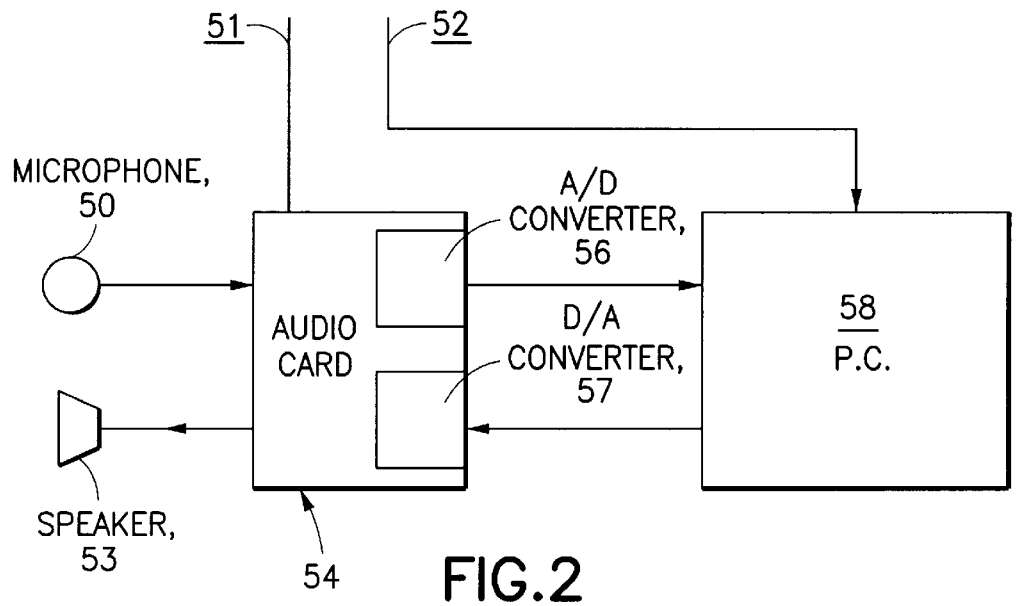
FIG. 2 is a block diagram indicating hardware components of a system implementing the present invention.

Referring now to FIG. 2, the system comprises the following hardware components:

a microphone 50;
 a telephone line 51;
 a LAN connection 52;
 a set of loudspeakers 53 (or a headset);
 an audio card 54 including an A/D converter 56 and a D/A converter 57;
 a PC 58.

On recording, the A/D converter 56 in the audio card 54 translates the analogue audio signal derived from the microphone 50 (or from the telephone line 51) into a standard digital representation of the recorded speech, or the PC takes a digital signal from the LAN connection 52, and the data is stored in the standard ".wav" file format. The D/A converter 57 performs the converse digital-to-analogue conversion in order to play back a digital ".wav" file through loudspeakers 53.

Figure 3:
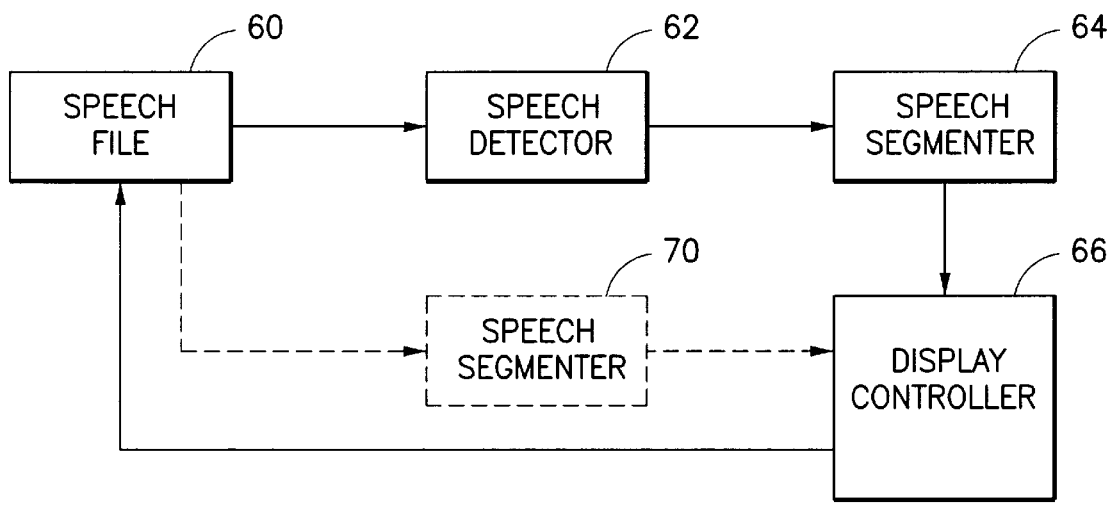
FIG. 3 is a block diagram indicating software components of a system implementing the present invention.

Referring to FIG. 3, the system comprises the following software components for processing the contents of a speech file 60:

a speech detector 62;
 a speech segmenter 64;
 a display controller 66.

In one embodiment, an off-line speech detector 62 is used to perform speech/silence detection. The detector 62 operates in an off-line mode ie. it requires the entire speech file 60, and implements the following steps:

1. Divide the speech into 10 ms frames, and for each frame calculate an approximation to the energy:

$$\text{int}[40 \times \log 10(\Sigma|\text{sample}|)]$$

2. Create a histogram of the number of frames at each integer energy value.

3. Smooth the histogram using a three point averaging filter.

4. Find the first peak in the histogram, and make the speech/silence threshold a fixed amount (3 histogram bins= 1.5 dB) above this. (The assumption here is that the first peak in the histogram is a good estimate of the mean noise level.) Then classify each frame as speech or silence depending on this threshold.

5. Fill in isolated patches of silence in speech. If the time gap between one frame of speech and another is within a predetermined range, any silence frames between them are changed to speech. The predetermined time has been set to 100 ms.

6. Fill in isolated patches of speech in silence. Speech segments of less than a predetermined duration are removed. This duration value has been set to 7 frames.

Alternatively a standard on-line speech detector may be used ie. one which processes the speech data on the fly as the speech file 60 is being received.

The output of the speech detector 62 is a series of speech blocks separated by pauses. For the reasons explained in the introduction, this gives too many segments for the purposes of visual display and playback and so a method for eliminating all but the most important pauses is needed. Using the present invention there are several ways of doing this, all of which have the aim of producing segments of a certain target length. In practice the target length may typically be 5 seconds.

The first possible approach is to use an adaptive threshold for the pause length. In this case the pause-length threshold is set to make the number of breaks proportional to the length of the speech file, to achieve a required average speech block length. In other words, a desired pause number n is derived by dividing the duration of the speech file by the target speech block length and only the n most significant pauses in the file are retained as speech block boundaries. This method produces some variability of results between the messages with very long segments remaining at some points in a message, while short fragmented patches appear elsewhere.

The previous algorithm used a single pause length threshold for the whole speech file, making a decision on a global basis which may be inappropriate at local places in the file. An alternative method, the 'Hierarchical method', instead makes decisions at a more local level. The Hierarchical method recursively splits the file into smaller and smaller segments. The following procedure is used, employing a chosen error metric to calculate error values:

1. Calculate the error value $\epsilon$ of the speech segment as a whole

2. Find the most significant pause in the segment

3. Let the original segment be of length $l_{Old}$ frames. If the pause found in step 2 were classified as a speech block boundary, then let the length of the two resulting speech blocks be $l_a$ and $l^b$ respectively. The "old" and "new" errors can then be defined as follows, where $l_T$ is the target length:

$$\epsilon_{old} = (l_{Old} - l_T)^2$$

$$\epsilon_{new} = [(l_a - l_T) + (l_b - l_T)^2] \div 2$$

If $\epsilon_{new} < \epsilon_{old}$ then the pause found in step 2 is classified as a speech block boundary, otherwise it is not.

The above procedure is then recursively applied to each successive pair of resulting segments. If $\epsilon_{new} > \epsilon_{old}$ then the recursion terminates, with no further splitting of speech segments taking place.

Therefore, at the start of the Hierarchical method, the whole speech file is initially classified as speech, giving a long initial segment to which the recursive algorithm can be applied. This means that segmentations are made at a locally optimal level. Large segments will get broken up, even if the only pauses within them are relatively short, and conversely a long pause may not be classified as a speech block boundary if that would result in short, fragmented speech blocks. The underlying assumption is that there is a useful size of speech block, with extremely long or short chunks likely to be an irritation to users.

A simple modification to the Hierarchical method is to use a slightly modified error metric:

$$\epsilon_{old} = (\sqrt{l_{old}} - \sqrt{l_T})^2$$

$$\epsilon_{new} = [(\sqrt{l_a} - \sqrt{l_T})^2 + (\sqrt{l_b} - \sqrt{l_T})^2] \div 2$$

The 'Hierarchical (sqr) method' was found to give better results for certain data samples.

The Hierarchical method and the Hierarchical (sqr) method can be further modified by adding a second "merging" stage. In this method, the 'Hierarchical (sqrme) method', speech blocks can also be merged together to derive segments which are even closer to the target speech block length. The algorithm is as follows:

1. Define the speech blocks using the Hierarchical method (or the Hierarchical (sqr) method) as before 2. For each pause which has been classified as a speech block boundary, calculate the error difference ($\Delta \epsilon$), where:

$$\Delta \varepsilon = \{[(\sqrt{l_a} - \sqrt{l_T})^2 + (\sqrt{l_b} - \sqrt{l_T})^2] \div 2\} - (\sqrt{l_{ab}} - \sqrt{l_T})^2$$

where $l_a$ and $l_b$ are the length of the segments to the left and right of a speech block boundary, and $l_{ab}$ is the length of the speech block if the boundary were deleted to form one combined speech block.

3. If none of the error differences are positive, finish the merge stage

4. Otherwise delete the speech block boundary with the largest value for $\Delta \epsilon$, and repeat from step 2.

In this way adjacent short speech segments are merged to form single speech blocks which are closer to the target speech block length.

The difference between the Hierarchical (sqr) and Hierarchical (sqrme) methods is that the Hierarchical (sqrme) method gives far less variance in the speech block sizes, with most blocks being close to the target speech block size. The Hierarchical (sqr) method gives more variation of speech block sizes around the central, target speech block length.

The three segmentation algorithms described above rely on a reasonable number of pauses being found by the speech/silence detector. If the detector fails because of high noise levels, or if it mislabels silence as speech, there is nothing the speech segmentation algorithm can do to correct it. An alternative, single-pass, method overcomes this problem, with no performance penalty.

In another embodiment of the present invention no separate speech detector is used. Instead a combined speech detector and speech segmenter 70, shown dotted in FIG. 3, is used which processes the speech file 60, both detecting speech and segmenting the speech data.

The single pass method is based on the Hierarchical (sqrme) method described above, but instead of searching for the most significant pause in a speech segment, it searches for the 400 ms interval with the lowest energy, not including the first and last 500 ms portions. To do this, a 400 ms window is moved in 10 ms steps across the speech segment.

Once the lowest 400 ms energy interval is found, the interval is widened until the short term (10 ms) energy on either side of the interval increases by 3 dB. This interval becomes the pause considered by the segmentation algorithm.

This algorithm gives very good performance even at very high noise levels. The drawback of the algorithm as it stands which prevents it from being universally useful is that, when expanding out the 400 ms interval it finds' it errs on the side of keeping a pause short. This is very good for voicemail where there are rarely, if ever, long silences, but not very good for recordings where long silences have to be clearly identified. For speech files where there are likely to be long silences which need to be detected as such, one of the other algorithms described above combined with an on-line speech detector may be used.

The segmented speech derived from the speech segmenter 64 (or the combined speech detector and speech segmenter 70 if the single-pass approach is used) is processed by the display controller 66 for display as shown in FIG. 1.

During use, a user may select one or more blocks of speech for playback and this causes the display controller 66 to access the speech file 60 to initiate playback of the relevant part. The selected speech data is converted using the D/A converter 57 and played back to the user via the loudspeakers 53 (or headset) shown in FIG. 2.

It will be understood that the present invention is not limited to application in systems which display segmented speech to a user, but may also find application in systems where no display of segmented speech is involved, eg. medical information systems in which speech is segmented for playback in synchrony with material being displayed to the user or voicemail systems in which messages are accessed by telephone. In the latter case, segmentation is still useful for navigation and saving of relatively short sections of speech.

We claim:

1. A method of speech segmentation comprising processing speech data so as to detect pauses and characterised by forming speech block boundaries at a selected subset of the pauses, wherein said subset of said pauses is selected so as to approximate each speech block to a preselected target speech block length.

2. A method according to claim 1 comprising:
   devising an error metric which indicates how much a speech block length deviates from the target speech block length;
   calculating the error value for the speech data in a file;
   detecting the most significant pause in the speech data;
   calculating the average error value for the speech blocks on either side of the speech block boundary at the pause and retaining the speech block boundary in the speech data if said average error value is less than the current error value;
   iteratively detecting the next most significant pause, calculating the average error value for the speech blocks on either side of the speech block boundary at the next most significant pause and retaining the speech block boundary in the speech data if this further reduces the error value.

3. A method according to claim 2 wherein the error value is proportional to the square of the difference between the duration of a speech block and the target speech block length.

4. A method according to claim 2 wherein the error value is proportional to the square of the difference between the square roots of the duration of a speech block and the target speech block length.

5. A method according to claim 2 comprising the further steps of:
   for each speech block boundary which is retained, comparing the average error value for the speech blocks either side of the boundary with the error value for a block comprising the sum of the two blocks,
   deleting the speech block boundary that gives the greatest error reduction,
   repeating these steps until no further error value reduction is obtained.

6. A method according to claim 2, wherein the significance of a pause is proportional to the duration of the pause.

7. A method according to claim 2, wherein the significance of a pause is inversely proportional to the energy of the pause.

8. A method according to claim 1 comprising using a speech/silence detector to identify pauses before processing the speech data.

9. A method according to claim 1 comprising searching for the lowest energy interval of predetermined size in a segment of speech data and treating that lowest energy interval as the most significant pause in the respective speech segment.

10. A method of speech segmentation comprising:
    processing speech data so as to detect pauses;
    forming speech block boundaries at a selected subset of the pauses, selection being based on a preselected target speech block length, said selection accomplished by dividing the total duration of the speech data in a file by the target speech block length to derive a desired pause number n, and detecting the n most significant pauses in that file and forming speech block boundaries at these n pauses in the speech data.

11. A method according to claim 10 wherein the significance of a pause is proportional to the duration of the pause.

12. A method according to claim 10 wherein the significance of a pause is inversely proportional to the energy of the pause.

13. A method according to claims 10 comprising searching for the lowest energy interval of predetermined size in a segment of speech data and treating that lowest energy interval as the most significant pause in the respective speech segment.

14. A system for implementing a method of speech segmentation comprising:
    detector means for processing speech data so as to detect pauses; and
    segmenter means for forming speech block boundaries at a selected subset of the pauses, said selected subset being selected so as to aproximate each speech block to a preselected target speech block length.

15. A system according to claim 14 further comprising display means for representing speech data in the form of speech blocks.

16. A system for implementing a method of speech segmentation comprising:

detector means for processing speech data so as to detect pauses; and segmenter means for forming speech block boundaries at a selected subset of the pauses, selection of said selected subset being such as to approximate each speech block to a preselected target speech block length, said selection accomplished by dividing the total duration of the speech data in a file by the target speech block length to derive a desired pause number n, and detecting the n most significant pauses in that file and forming speech block boundaries at these n pauses in the speech data.

\* \* \* \* \*